United States Patent [19]

Hubertson

[11] 4,284,264

[45] * Aug. 18, 1981

[54] BUTTERFLY VALVES

[75] Inventor: Folke H. Hubertson, Säffle, Sweden

[73] Assignee: Aktiebolaget Somas Ventiler, Säffle, Sweden

[*] Notice: The portion of the term of this patent subsequent to Mar. 10, 1998, has been disclaimed.

[21] Appl. No.: 160,148

[22] Filed: Jun. 17, 1980

[30] Foreign Application Priority Data

Jan. 17, 1980 [SE] Sweden .................................. 8000318

[51] Int. Cl.$^3$ ............................................. F16K 1/22
[52] U.S. Cl. ..................................... 251/305; 251/306
[58] Field of Search ................................. 251/305, 306

[56] References Cited
U.S. PATENT DOCUMENTS 3,329,398   7/1967   Goldsmith .......................... 251/306
3,356,336  12/1967   Maenaka ............................. 251/306

Primary Examiner—William R. Cline
Assistant Examiner—H. Jay Spiegel
Attorney, Agent, or Firm—Murray and Whisenhunt

[57] ABSTRACT

A butterfly valve with a seal face (4) having two opposite, essentially spherical sections (h, i) intersected by a symmetry plane (k) through the throttle which coincides with an axis through a point (n) parallel with the torsional axis (j) of the throttle and two opposite, essentially conical sections (f, g) on both sides of the symmetry plane. The spherical and the conical sections successively merge into each other. When the throttle is revolved to shutting position, the sealing line (a) which has circular shape is pressed against a valve seat (18) shaped as a circular ring made of steel. An eccentrical location of the torsional axis (j) will cause that a surface contact between throttle and valve seat wil occur simultaneously along the entire sealing line in the shutting movement.

8 Claims, 12 Drawing Figures

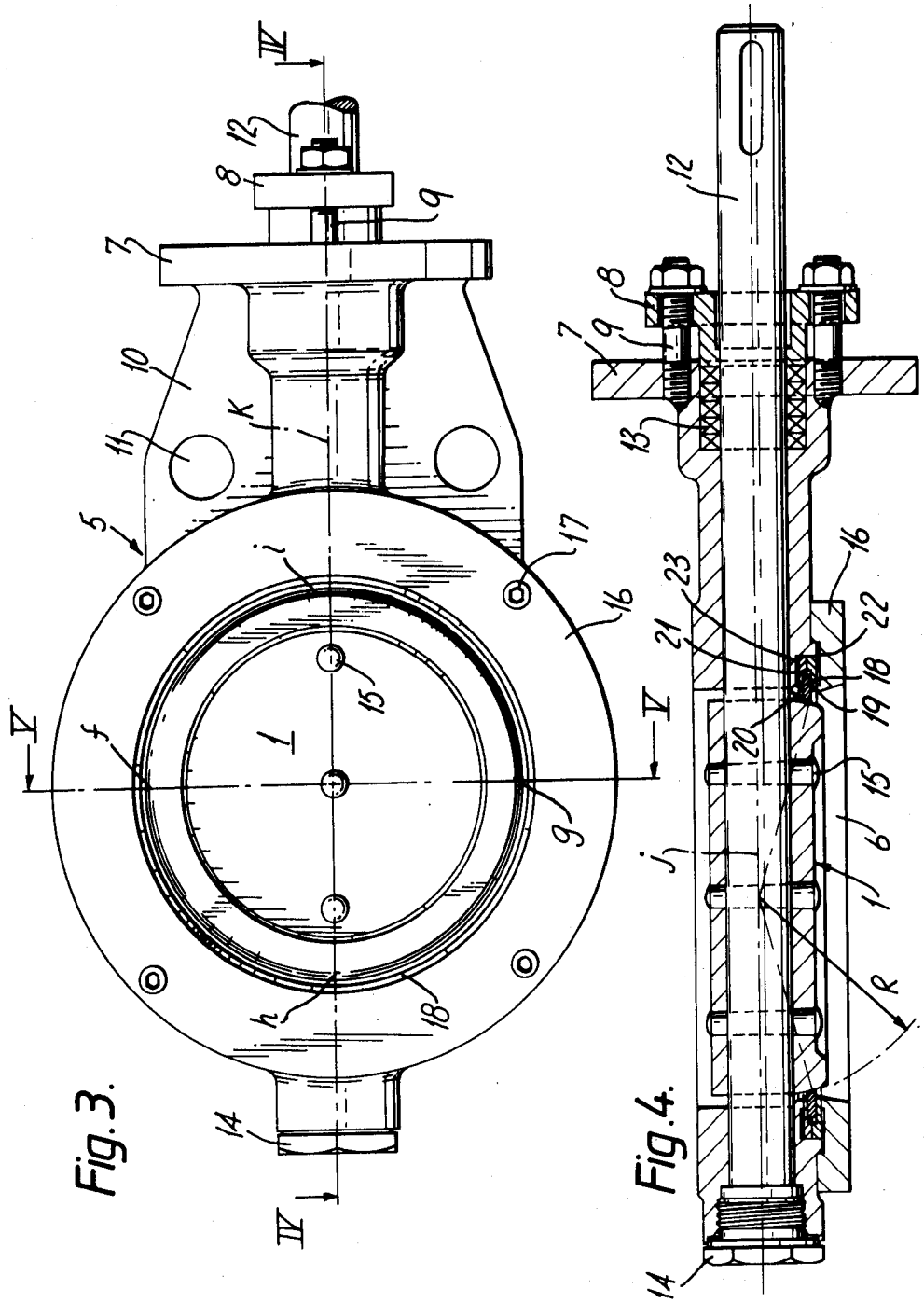

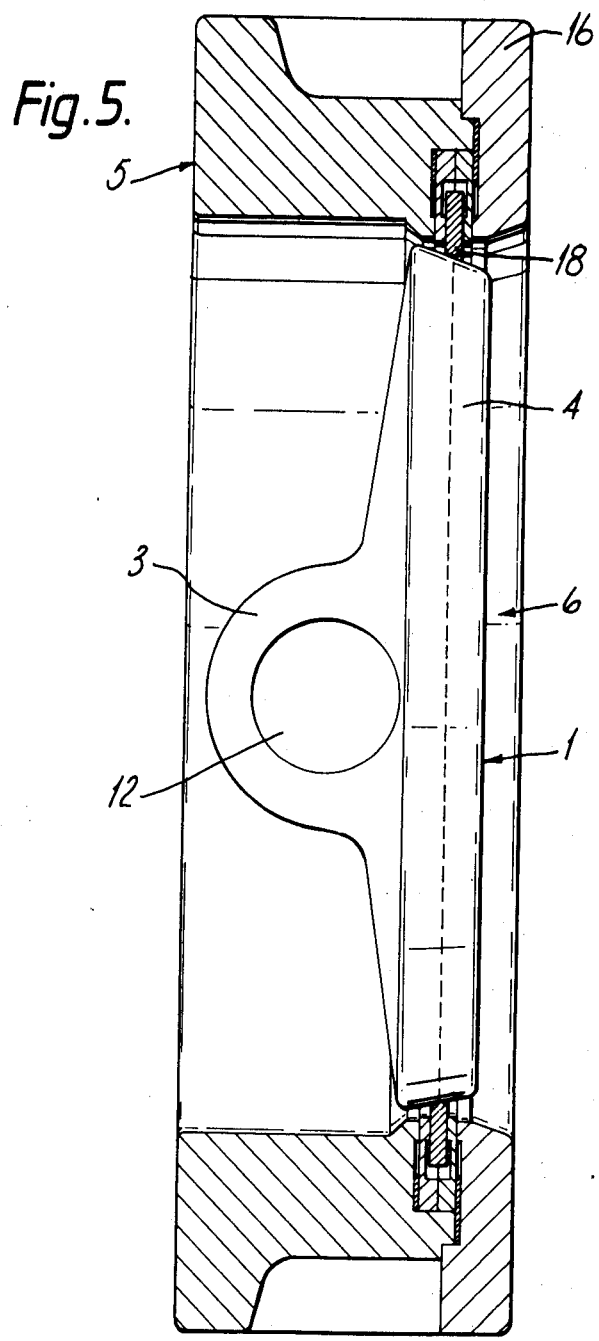

BUTTERFLY VALVES

TECHNICAL FIELD

The invention refers to a butterfly valve embodying a valve housing with a valve seat and a throttle arranged so as to revolve around a shaft going through the valve housing, between an open position and a shut-off position in which a seal face of the throttle is pressed against the seat in the valve housing.

BACKGROUND ART

The butterfly valves in existence today are usually built on the principle of soft gaskets. A very frequent valve type is illustrated in e.g. the Swedish patent specification No. 199 078. With this valve type the whole of the valve housing is lined with a soft material, e.g. rubber or other polymer. A frequent thing is also to manufacture just the valve seat itself from a soft material. Examples of this valve type are illustrated in the Swedish patent specifications Nos. 175 149 and 178 131. There are also cases of the soft sealing element being instead placed on the sealing face of the throttle. Examples of this principle are shown in the Swedish patent specification No. 195 072 and the German patent specifications Nos. 1 011 683 and 1 232 422.

A disadvantage of soft sealing elements in butterfly valves is that their resistance to high-temperature media is often low. It is true that the insensitiveness of synthetic rubber and certain other polymers to high temperatures has gradually improved, but still these kinds of material cannot in any way compare favourably with the resistance to high temperatures of steels and other metals and alloys. The same thing also applies to the resistance to certain chemically aggressive media. In these cases, too, the properties of highalloyed stainless steels and other alloys are quite superior to those of soft materials of rubber type. These circumstances are of course well-known, and many a trial has been made with replacing the soft sealing elements by metallic ones. In these cases, however, the sealing has not been to satisfaction or has the sealing device and/or the equipment parts belonging to it become so complicated that this valve type has not got any practical importance so far. An example of a valve belonging to this category is shown in the Swedish patent specification No. 193 923.

DISCLOSURE OF INVENTION

The main object of the present invention is to provide a butterfly valve having good sealing capacity and not implying soft sealing element made of rubber, plastic or similar materials. More specifically an object is to produce a valve having good sealing capacity and which can be entirely manufactured of metal. An object of the present invention is, however, that the principles of the invention shall not exclude the use of such soft materials as e.g. PTFE and nylon. There is rather an object that such materials will also have to be used, e.g. in valve seats, if for some reason or other these are more suitable or otherwise more desirable than metallic materials. In other words, a purpose of the present invention is to create liberty of choice between different materials in regard to their convenience for the medium which the valve is intended to operate with.

Another object is to provide a valve the throttle of which when being turned from its shut-off to its open position and vice versa is not principally in contact with the valve seat, which is favourable from a wear point of view.

An object of this invention is also to provide a butterfly valve being sturdy and reliable, simple to operate and having a long life.

This invention is an improvement over the valve which is disclosed in SE No. 78 11864-3, which is characterized in that the seal face of the swivel throttle has two opposite, essentially spherical sections intersected by a symmetry plane through the throttle, which plane coincides with the swivel stem of the throttle and two opposite, essentially conically shaped sections on both sides of the aforementioned symmetry plane between the two essentially spherically shaped sections, and by the fact that the essentially spherically and the essentially conically shaped sections successively merge into each other.

Moreover, according to the invention, the center axis of the conically shaped faces is placed at a slight angle to a shaft coinciding with the above-mentioned symmetry plane and is perpendicular to the pivot shaft of the damper. The angle will vary according to the dimensions of the throttle, like its diameter and the width of the seal face. In the normal case the angle should be between 5° and 8°. At the same time it is suitable that the angle between the conical sections, i.e. the top rake of the cone, amounts to between 10° and 40°, at which the optimal angle is determined by the dimensions of the valve. The torsional axis of the valve further preferably is eccentrically journaled such that during the shutting movement there will be a combination of rotational and axial movements of the sealing line of the valve disc against the valve seat, said sealing line and valve seat both having circular shape and the same diameter.

According to the invention the seat further is arranged to be flexible and/or displaceable in its plane so that, when the valve disc is pressed against the seat, the seat can concur with the shape of the curve going around the circumference of the seal face at the level determined by the contact points between seal face and valve seat. According to the invention the curve mentioned before is circular. This implies that the seat is flexible and/or displaceable in its own plane so that it can adapt itself to the position of the throttle or valve disc when the valve is shut. More particularly the valve seat is suitably arranged displaceable in an annular groove in the valve housing. According to the best mode of carrying out the invention the annular groove is formed by a couple of spring washers which are for sealing reasons pressed to both sides of the valve seat ring. Suitably the spring forces of the spring washers are so great that the position of the seat ring will be maintained when the valve is reopened.

Further objects and advantages as well as characteristics of the invention will appear from the following description of the best mode of carrying out the invention.

BRIEF DESCRIPTION OF DRAWINGS

In the following description of the best mode of carrying out the invention references will be made to the drawing figures.

FIG. 3 shows a planer view of the butterfly valve according to the preferred embodiment.

FIG. 4 is a section IV—IV in FIG. 3.

FIG. 5 is a section V—V in FIG. 3.

BEST MODE OF CARRYING OUT THE INVENTION

Figure 1:
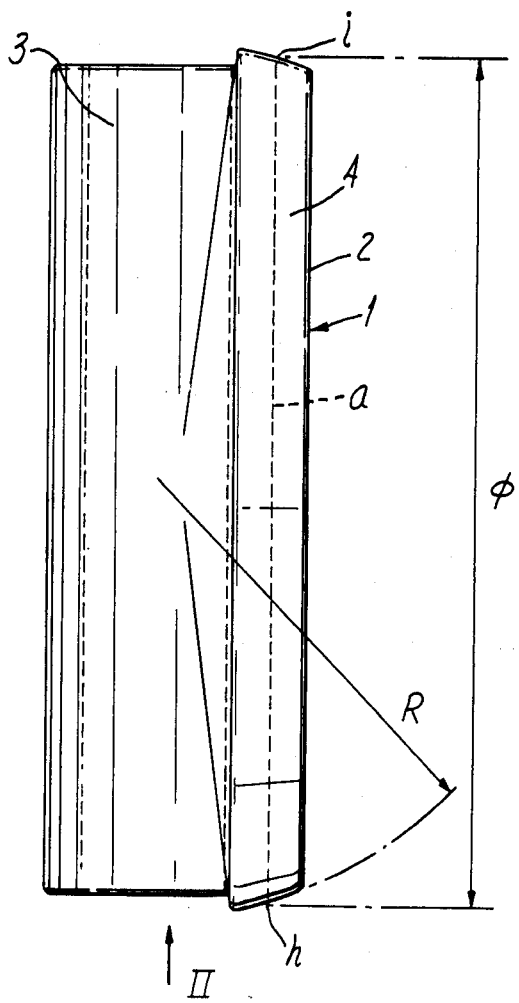
FIG. 1 is a side view of the throttle contained in the valve.
Figure 2:
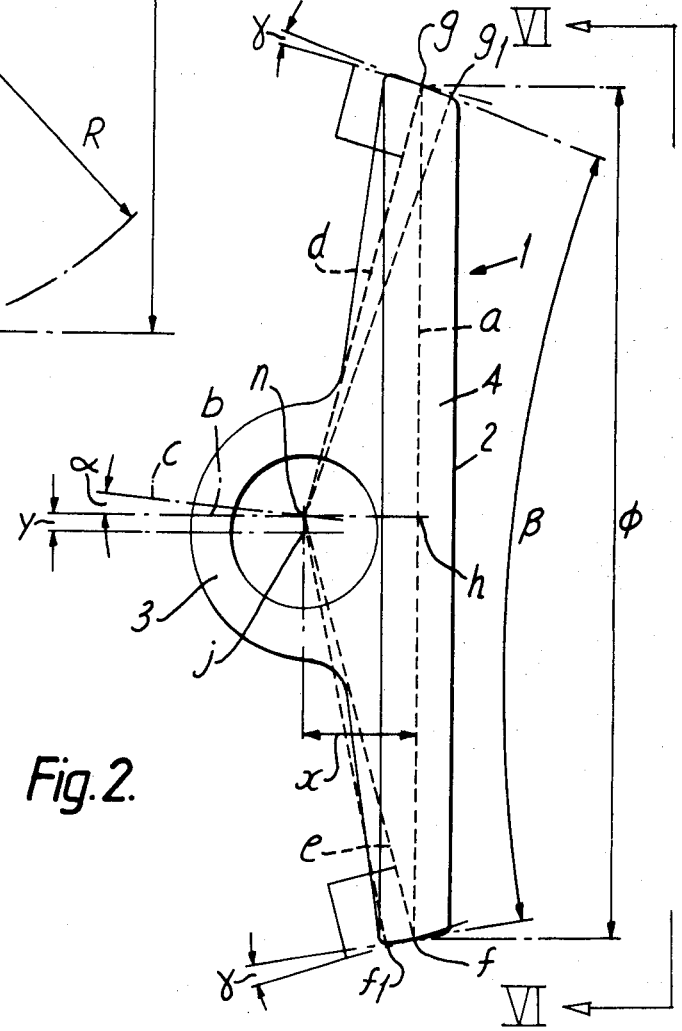
FIG. 2 is a section II—II in FIG. 1 and illusrates the geometrical conditions at the throttle in the valve.

Reference is first being made to FIG. 1 and FIG. 2 that show a side view of the throttle according to the best mode of carrying out the invention, the throttle in general shown as 1. The throttle 1 consists of a throttle disc 2 with an annular seal fice 4 and a bearing 3. The mean line a going all around the seal face 4 has a circular shape $\phi$. More specifically the mean line a forms a circle obtained as a section through an imaginary elliptical cone having the tip rake $\beta$, with the perpendicular b to the section level forming the angle $\alpha$ to the axis c of the cone.

The torsional axis j of the throttle 1, which axis j is parallel to the level of the mean line a, is dislocated the distance X from said level. More specifically the distance X is chosen so that the straight line d and e between a point n (at the symmetry level of the throttle as per FIG. 1) and the points of intersection f and g of the mean line with the diameter of mean line form the angles $90°+\gamma$, and $90°-\gamma$, resp., to the generating line of the envelope surface 4 which in the area of points f and g has a conical shape. More specifically the distance X is chosen so that the angle $\gamma=\alpha$. The torsional axis j further is displaced a distance y from the point n.

These geometrical conditions imply that the point called $f_1$ in FIG. 1 will describe an arc having a radius which is less than the radius of the arc described by a point f when the throttle is turned counterclockwise around its torsional center j. On the opposite side of the seal face 4, i.e. in the conical area of point g, the conditions are analogous. Thus the arc generated by point g, has a smaller radius than the circle generated by point g. These conditions may also be expressed $nf_1<nf$, and $ng_1<ng$, respectively.

In the areas of points f and g, i.e. in the areas of the intersecting points between mean line a and lines d and e, the seal face 4 has a conical shape. In the areas of the points h and i on the main line a the seal face 4 has, however, been given a spherical shape, with the radius R of the sphere corresponding to the distance from points h and i to the point n. In the areas between the conical and spherical sections of seal face 4, the conical and spherical shapes successively merge into each other. The shapes of the throttle 1 may be produced by copying a cast work piece.

In FIG. 3–5 a valve housing is generally marked with the digital 5. The valve housing 5 forms a circular opening 6 for the medium to be led through the valve, the opening 6 having a somewhat larger diameter than the mean line a on the seal face 4 of the throttle 1. The valve housing 5 is provided with a flange 7 for the connection of an adjusting appliance and with a gland 8 mounted by means of stud bolts. A couple of lugs 10 are provided with holes 11 to make fitting into a piping easier.

A stem 12 carried in a bearing in the valve housing 5 goes through the housing and is tightened on the control side by a stuffing box 13 and on the opposite side by a plug 14. Furthermore, the stem 12 goes through the bearing 3 of the throttle 1. The throttle 1 is fixed to the stem 12 by means of conical rivets 15. The axis of spindle coincides with the torsional axis j of the throttle.

A covering plate 16 is fixed to the valve housing 5 by means of screws 17. Between covering plate 16 and valve housing 5 is arranged for a valve seat 18. The valve seat 18 consists of a comparatively flat ring having a rounded inner edge. By "comparatively flat" is understood that the thickness is considerably smaller than the radial extension. The material of the valve seat ring 18 is normally steel or some other alloy, but other comparatively stiff though to a certain extent elastic materials are conceivable, such as certain rigid plastics type PTFE. The valve seat ring 18 is carried in a bearing between a couple of opposite spring washers 19 and 20 which form a groove 21 in which the valve seat is displaceable in the radial direction. Two gaskets have been marked 22 and 23 respectively.

The flat ring constituting the valve seat 18 has a quite circular shape. When the valve is shut by turning the stem 12 in clockwise direction around the torsional axis j, FIG. 2 and FIG. 5, the mean line a of the throttle will contact the rounded inner edge of the valve seat 18. The eccentrical orientation of the torsional axis j (at a distance y from the point n in the plane of symmetry of the throttle, FIG. 1) will cause that the throttle 1, towards the end of the shutting movement at the same time will displace the mean line a in the axial direction against the valve seat 18. If the circular mean line a and the valve seat would not be quite concentrical, which may occur when a new valve for the first time will be used or after reassembly of a used valve, the sealing face 4 of the throttle will displace the seat ring 18 in the radial direction in the groove 21. When the mean line a and the valve seat 18 both are circular and have the same diameter, the valve seat however will maintain its circular shape also in the shutting position. When the valve is reopened by turning the stem 12 counterclockwise around the torsional axis j the adopted position of the valve seat will be maintained through spring action of the spring washers 19, 20, and the mean line a of the throttle will be axially displaced from the valve seat 18. At the same time in the points f and g there will occur that said points immediately will be released from their contact with the valve seat 18, and through the angle $\gamma$ the play will increase in accordance with the expression $nf_1<nf$, and $ng_1<ng$, respectively. These conditions imply that contact between the sealing face of the throttle 1 and the valve seat 18 will occur only when concentricity between the seal face 4 of the valve and the valve seat 18 have been well established during the very last portion of the shutting movement, and the very first portion of the opening movement, respectively. Herethrough the mechanical wear will be reduced to a minimum and hence a long lifetime aimed at will be obtained.

Figure 6:
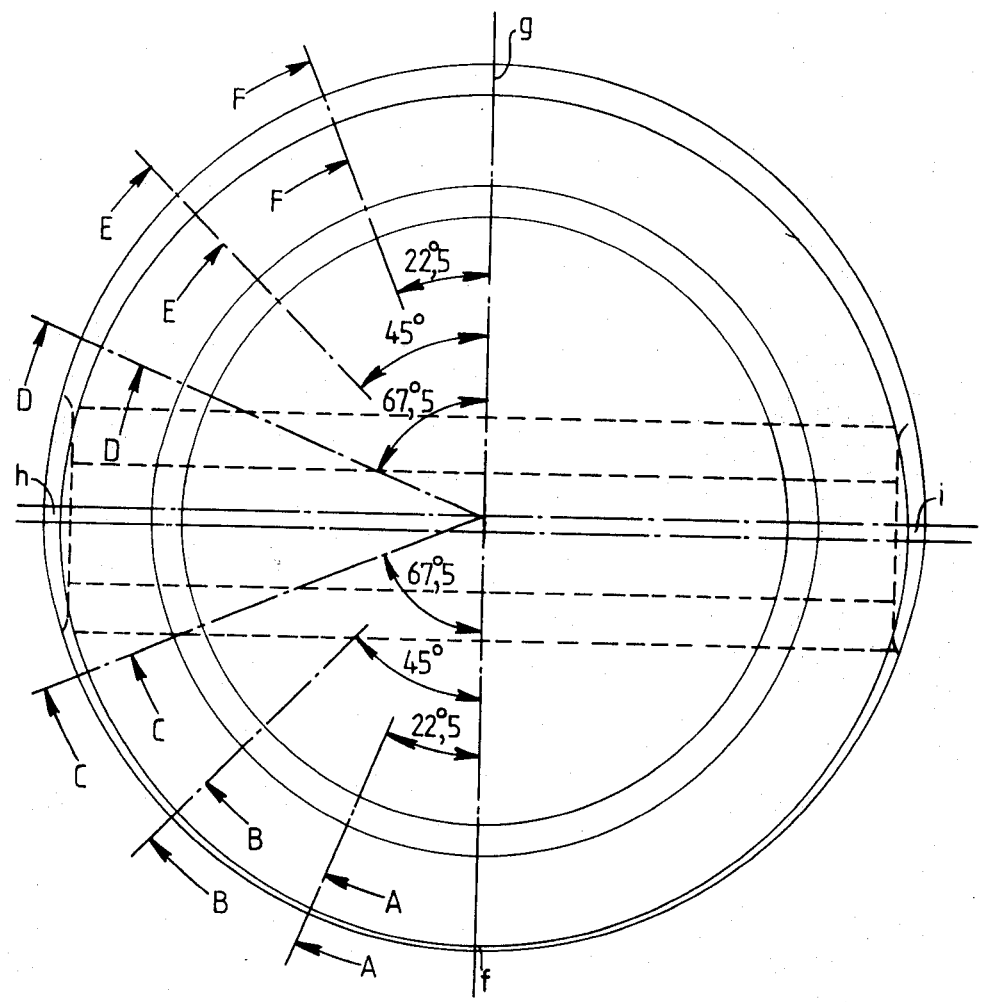
FIG. 6 is a view VI—VI in FIG. 2.
Figure 7A:
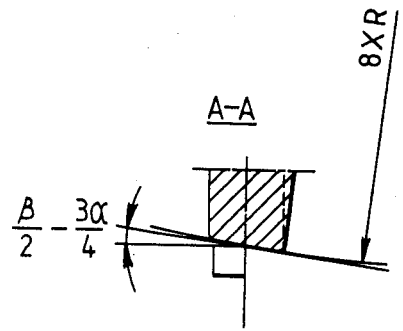
FIG. 7A-F are sections A—A, B—B, C—C, D—D, E-E and F—F in FIG. 6.
Figure 7B:
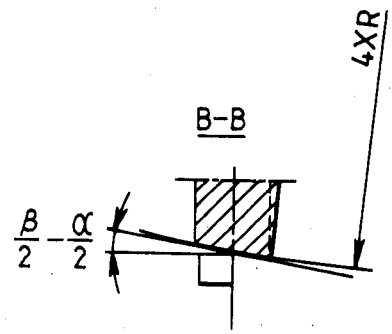
Figure 7C:
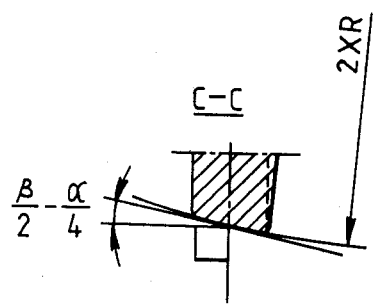
Figure 7D:
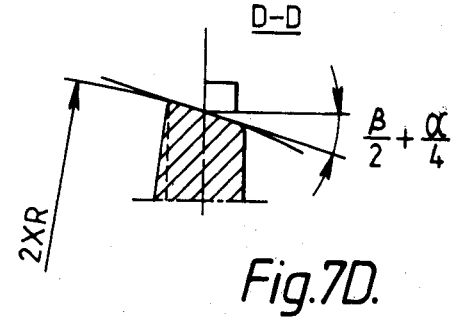
Figure 7E:
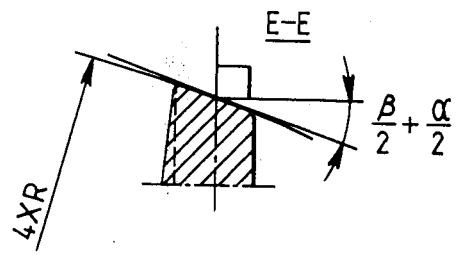
Figure 7F:
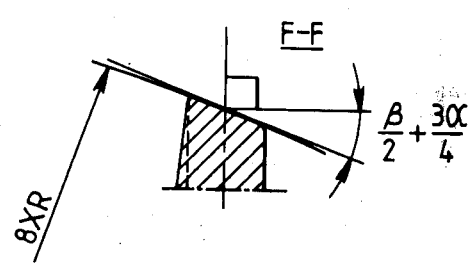

How the sections of the seal face successively merge into each other is more clearly understood with reference to FIGS. 7A-F, where FIG. 7A shows a section A—A in FIG. 6 in which the seal face 4 has a radius $8 \times R$, i.e. approaching the conical shape. In section B—B, FIG. 7B, the radius is $4 \times R$ and in section C—C, FIG. 7C, the radius is $2 \times R$, i.e. approaching the radius R of the seal face 4 in points h and i. On the other side of points h and i the radius of the seal face 4 is again increasing towards the points f and g as is shown by sections D—D, FIG. 7D, E—E, FIG. 7E and F—F, FIG. 7F where the seal face 4 has the radii $2 \times R$, $4 \times R$ and $8 \times R$, respectively.

I claim:

1. Butterfly valve comprising a valve housing including a valve seat and a throttle arranged to be turned around a stem going through the valve housing between an open position and a shut-off position in which a seal face on the throttle is pressed against the seat in the valve housing, the seal face having two opposite, essentially spherical shaped sections intersected by a symmetry plane through the throttle coinciding with the torsional axis of the throttle, and two essentially conically shaped sections on each side of said symmetry plane between the two essentially spherical shaped sections, the essentially spherical and the essentially conical sections successively merging into each other, a curve around the circumference of the throttle having essentially the shape of a circle, and being the sealing line of the throttle said sealing line defining approximately a plane which is offset from said torsional axis, and a seat which is displaceable in the plane thereof so that the seat when the throttle is pressed against same essentially without sliding can adopt itself to the shape of said essentially circular curve extending around the circumference of the sealing face, and said seat can also adopt a proper orientation in the plane of said curve.

2. Butterfly valve of claim 1, wherein the torsional axis, parallel to the plane determined by the curve around the circumference of the throttle, being arranged a distance from said plane that the perpendiculars from the intersecting points between the essentially circular shaped curve and its axis to the torsional axis form the angles $90°+\gamma$ and $90°-\gamma$, respectively, to the generating lines of the conical surface, with the angle $\gamma$ being essentially equal to the angle $\alpha$ between the center line of the conically shaped surface perpendicular to the plane formed by the said essentially circular curve.

3. Butterfly valve of claim 2, wherein the torsional axis is eccentrically placed at a distance from the line of symmetry.

4. Butterfly valve of claim 2, wherein the angle $\alpha$ is between 5° and 8°.

5. Butterfly valve of claim 4, wherein the top rake of the conical surface is between 10° and 40°.

6. Butterfly valve of claim 1, wherein the torsional axis is eccentrically placed at a distance from the line of symmetry.

7. Butterfly valve of any one of claims 1, 2, 3 or 6, wherein the sealing line of the throttle as well as the valve seat have a circular shape and substantially the same diameter.

8. Butterfly valve of any one of claim 1, 2, 3 or 6, wherein the valve seat includes a comparatively flat ring arranged so as to be radially displaceable in a groove in the valve housing.

* * * * *